United States Patent
Yeom et al.

(10) Patent No.: US 7,415,004 B2
(45) Date of Patent: Aug. 19, 2008

(54) METHOD FOR PROVIDING VOICE OVER INTERNET PROTOCOL CALL SERVICE

(75) Inventors: Eung-Moon Yeom, Suwon-shi (KR); Jung-Gi Kim, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1137 days.

(21) Appl. No.: 10/270,341

(22) Filed: Oct. 15, 2002

(65) Prior Publication Data

US 2003/0123435 A1 Jul. 3, 2003

(30) Foreign Application Priority Data

Dec. 27, 2001 (KR) ............... 2001-85658

(51) Int. Cl.
*H04L 12/66* (2006.01)
(52) U.S. Cl. ..................... 370/352; 379/219
(58) Field of Classification Search ......... 370/352–356, 370/395.2, 401, 410, 412; 379/219–220, 379/221.12
See application file for complete search history.

(56) References Cited

U.S. PATENT DOCUMENTS

| 4,159,402 | A | | 6/1979 | De Graauw |
| 5,333,185 | A | | 7/1994 | Burke |
| 5,524,146 | A | | 6/1996 | Morrisey |
| 5,805,587 | A | * | 9/1998 | Norris et al. ............ 370/352 |
| 5,911,485 | A | | 6/1999 | Rossmann |
| 5,940,478 | A | | 8/1999 | Vaudreuil |
| 5,956,394 | A | | 9/1999 | Andruska et al. |
| 6,016,343 | A | | 1/2000 | Hogan |
| 6,021,126 | A | | 2/2000 | White |
| 6,026,087 | A | | 2/2000 | Mirashrafi |
| 6,038,227 | A | | 3/2000 | Farris |
| 6,075,783 | A | | 6/2000 | Voit |
| 6,078,579 | A | | 6/2000 | Weingarten |
| 6,078,582 | A | | 6/2000 | Curry |
| 6,097,804 | A | | 8/2000 | Gilbert |
| 6,144,667 | A | | 11/2000 | Doshi |
| 6,150,962 | A | | 11/2000 | Rossmann |
| 6,151,390 | A | | 11/2000 | Volftsun |
| 6,337,858 | B1 | | 1/2002 | Petty et al. |
| 6,363,065 | B1 | | 3/2002 | Thornton et al. |
| 6,404,764 | B1 | | 6/2002 | Jones et al. |
| 7,139,263 | B2 | * | 11/2006 | Miller et al. ............ 370/352 |
| 2001/0046226 | A1 | | 11/2001 | Lee et al. |
| 2003/0016807 | A1 | | 1/2003 | Otsuka |

OTHER PUBLICATIONS

U.S. Appl. No. 60/330,330, filed Oct. 2001, Miller.
"Search Report under Section 17" dated on Apr. 2, 2003 issued by U.K. Patent Office.

* cited by examiner

*Primary Examiner*—Suhan Ni
(74) *Attorney, Agent, or Firm*—Robert E. Bushnell, Esq.

(57) ABSTRACT

A method for establishing VoIP connection between a caller and a called party. Upon receipt of a first dial tone, the caller enters only the access code of the called party's central office. Then, VoIP call setup and a speech path are established between a remote gateway and the caller via a local gateway. A second dial tone is generated by the central office of the PSTN of the called party and this dial tone is relayed to the caller which prompts the caller to enter the telephone number of the called party to thereby establish communication between the caller and the called party.

11 Claims, 5 Drawing Sheets

METHOD FOR PROVIDING VOICE OVER INTERNET PROTOCOL CALL SERVICE

CLAIM OF PRIORITY

This application claims priority to an application entitled "METHOD FOR PROVIDING VOICE OVER INTERNET PROTOCOL CALL SERVICE", filed in the Korean Industrial Property Office on Dec. 27, 2001 and assigned Serial No. 2001-85658, the contents of which are hereby incorporated by reference.

BACKGROUND OF THE INVENTION

1. Field of the Invention

The present invention relates to a voice over Internet protocol (hereinafter, referred to as "VoIP") system, and more particularly to an improved method for providing VoIP call service.

2. Description of the Related Art

A VoIP system provides a new scheme of communication service, which performs a voice data communication over the Internet rather than a public switch telephone network (PSTN) as an existing communication network. Unlike an existing scheme, since the voice data communication over the Internet employs a packet-based network and therefore charges for using domestic/international telephone lines are not incurred, the VoIP system can inexpensively carry out the voice data communication. The VoIP system is capable of transmitting video information as well as audio information using an ITU-T standard H.323 protocol.

An H.323-based packet network, which provides VoIP service, is made up of a gatekeeper, an H.323 terminal being an endpoint and a gateway, and also includes a multipoint control unit (MCU) for conference service. The gatekeeper, which is the most important component in the H.323-based packet network, performs major functions relative to a registration of the terminal and the gateway within a zone, an address management, a call connection control, a resource management, etc. The zone is an area in which one gatekeeper manages the terminal, the gateway, the MCU, etc.

The gateway acts to transmit audio and facsimile data, incoming into the PSTN, to the Internet after a real-time compression and protocol conversion. The gateway can be divided into several types according to a built-in and use form. For example, there are a built-in type, a server type, a stand-alone type and the like. A built-in type gateway is embedded into a key telephone system or a private branch exchange (PBX) in the form of a card. A server type gateway is mounted on a platform such as a window network terminal (NT). A stand-alone type gateway is structured independently with terminals. The stand-alone type gateway is divided into a stand-alone mode and a TANDEM (trunk and ENM (ear & mouth)) mode according to an operating mode. The stand-alone type gateway of the stand-alone mode is the gateway, which is directly connected to a plurality of telephone terminals and the stand-alone type gateway of the TANDEM mode is the gateway, which supports an interworking between heterogeneous office lines. The stand-alone type gateway of the TANDEM mode is connected to the PBX and/or the key telephone system over an inner T1/E1 interface, a loop (loop start trunk) interface and a subscriber line circuit (SLC) interface.

However, in order for a caller to make a VoIP call, the caller must submit, often in DTMF, a central office access code along with the telephone number of the called party before a VoIP speech path can be set up between the caller, a local gateway and a remote gateway. After the speech path is set up, the calling party receives a second dial tone indicating that the call can go through. However, the above method is inefficient in that the calling party must wait a substantial period of time for the call to be set up. What is needed is a more efficient method of placing a VoIP call to a called party connected to a PSTN.

SUMMARY OF THE INVENTION

It is therefore an object of the present invention to provide an improved method of connecting a calling party to a called party in a VoIP call.

It is further an object of the present invention to provide a method that reduces time in setting up a VoIP call.

It is yet another object of the present invention to provide a method for setting up a VoIP call that does not inconvenience the calling party with unnecessary delays.

These and other methods can be accomplished by a method of placing a VoIP call between a calling party and a called party. The method begins with the calling party picking up the receiver on his phone and listening for a first dial tone prompting the caller to enter the access code of the central office of the PSTN that services the called party. The DTMF access code is received by a local gateway that determines if the DTMF code is indeed an access code for the central office. If the code received by the local gateway is an access code to the central office, VoIP is setup between the local gateway and the remote gateway and a speech path is set up between the remote gateway, the local gateway and the calling party's terminal. The remote gateway seizes the central office of the PSTN of the called party, the central office of the called party sends a second dial tone to the remote gateway which is then relayed on to the local gateway and finally relayed to the calling party's telephone. The caller hears this second dial tone which sounds different from the first dial tone. Then, the caller enters the telephone number of the called party. These digits are sent in DTMF H.323 format to the local gateway and then to the remote gateway and finally to the central office of the PSTN of the called party. Then, the caller either hears a ring signal or a busy signal that informs the caller of the state of the called party's telephone. If the called party is not busy, the called party then picks up the receiver and the caller and the called party can begin conversation.

The above method is advantageous over other methods in that there is less waiting for the caller when placing a call to the called party.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
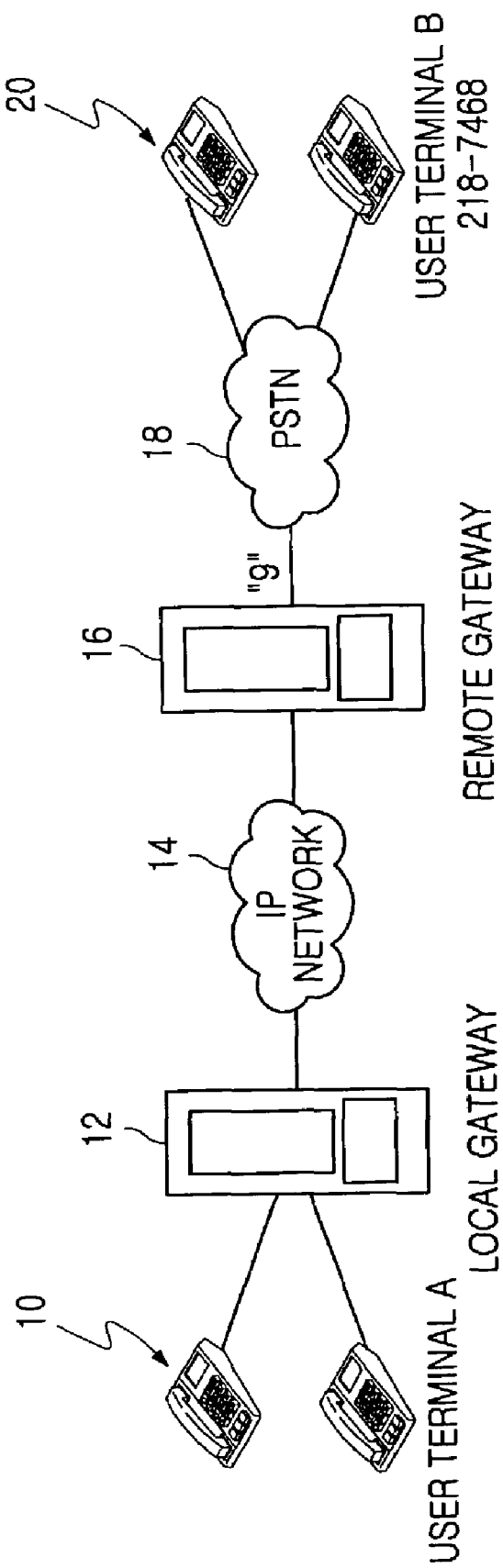
FIG. 1 is a view illustrating an exemplary VoIP system in which a local gateway operates in a stand-alone mode.
Figure 2:
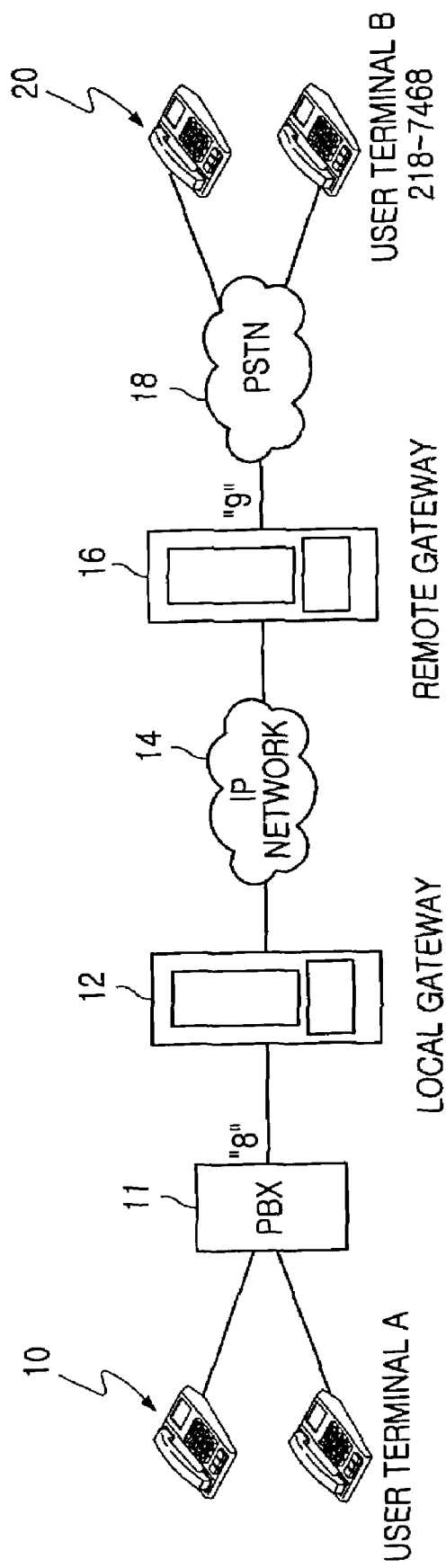
FIG. 2 is a view illustrating an exemplary VoIP system in which a local gateway operates in a TANDEM (trunk and ENM (ear & mouth)) mode.

FIG. 1 illustrates an exemplary VoIP system in which a local gateway operates in a stand-alone mode and FIG. 2 illustrates an exemplary VoIP system in which a local gateway operates in a TANDEM (trunk and ENM (ear & mouth)) mode. With reference to FIG. 1, a local gateway 12 of the stand-alone mode is directly connected to a plurality of user terminals A 10. The local gateway 12 and one side of a remote gateway 16 (or destination VoIP gateway) are connected to an IP network 14, and the other side of the remote gateway 16 is connected to a PSTN 18. The PSTN 18 is connected to a plurality of user terminals B 20. With reference to FIG. 2, the local gateway 12 of the TANDEM mode is connected to the user terminals A 10 via a private branch exchange (PBX) 11. In both FIGS. 1 and 2, a user terminal A 10 denotes a calling party user terminal and a user terminal B 20 denotes a called party user terminal.

Figure 3:
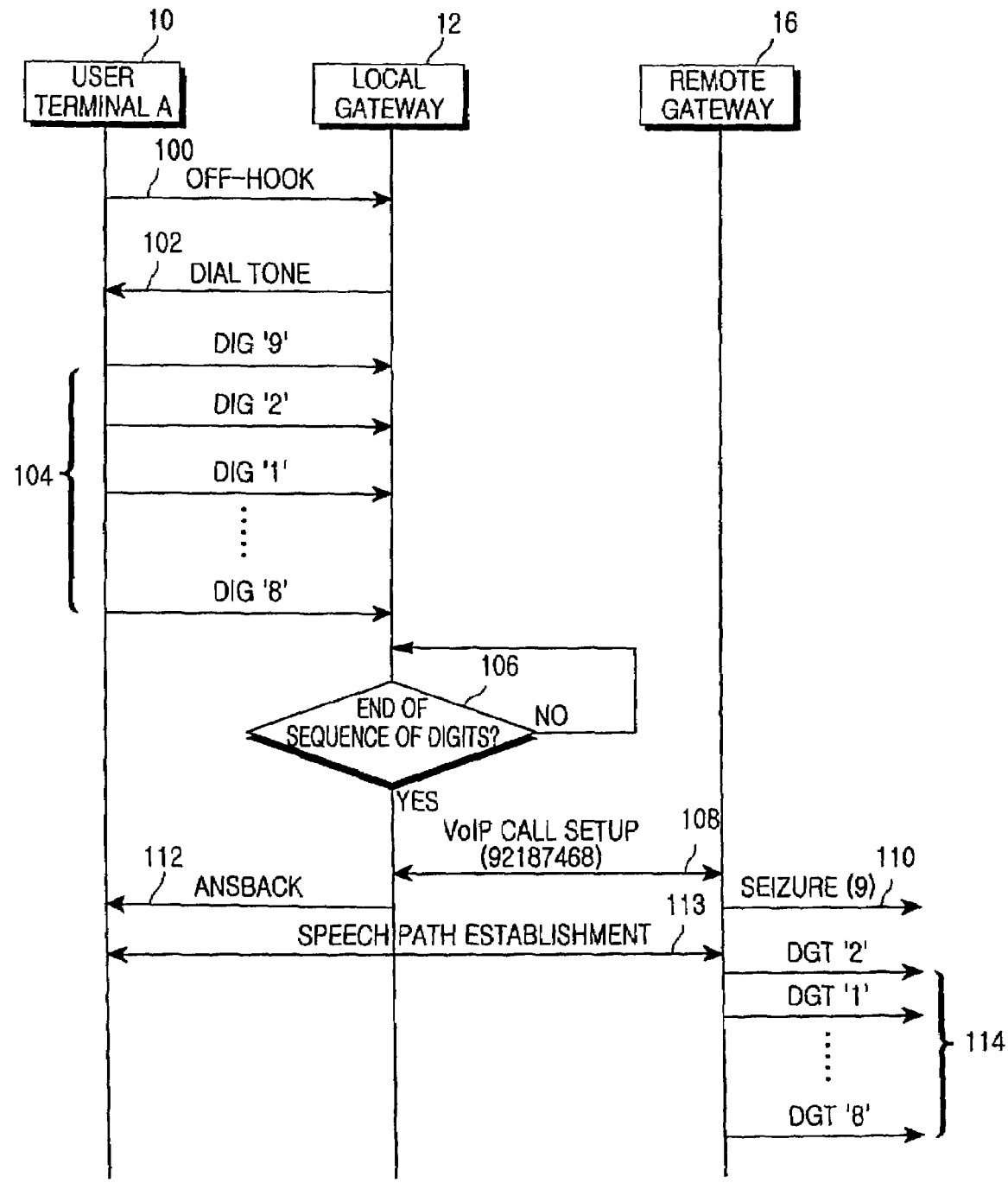
FIG. 3 is a flow chart illustrating an exemplary VoIP call service protocol.

FIG. 3 illustrates a flow chart illustrating an exemplary VoIP call service protocol for the apparatus depicted in FIGS. 1 and 2. With reference to FIGS. 1 through 3, a VoIP call service will be described. When the caller of the user terminal A 10 takes a handset off-hook when using the VoIP call service using VoIP gateways to communicate with a subscriber at terminal B, an off-hook signal is transferred from the user terminal A 10 to the local gateway 12 at step 100 shown in FIG. 3. In response to the off-hook signal, the local gateway 12 provides the user terminal A 10 with a dial tone in step 102. When the subscriber of the user terminal A 10 hears the dial tone, the caller then presses keys corresponding to a destination central office access code and a destination telephone number using a key input unit of the user terminal A 10. The digits of the destination central office access code and the destination telephone number are transferred from the user terminal A 10 to the local gateway 12 in step 104 of FIG. 3. In the example of FIGS. 1 through 3, it is assumed that the destination central office access code is '9' and the destination telephone number is '218-7468'. The digits (DGTs) of the destination central office access code and the destination telephone number are '9, 2, 1, 8, 7, 4, 6 and 8'.

In step 106, an end of a sequence of digits is determined by the entering of the '#' key or a lack of key input for a predetermined amount of time (e.g., three seconds) to the local gateway 12. After submission of the digits, the local gateway 12 collects the digits of the destination central office access code and the destination telephone number and then performs a VoIP call setup with the destination VoIP gateway 16 (EN-BLCOK scheme) as illustrated in step 108 of FIG. 3.

Hereafter, the local gateway 12 transmits an ANSBACK signal to the user terminal A 10 to inform the user terminal A 10 that a VoIP speech path establishment is possible at step 112 of FIG. 3, and then a VoIP speech path is established among the user terminal A 10, the local gateway 12 and the remote gateway 16 at step 113.

The remote gateway 16 then seizes the PSTN 18 using the digit '9' of the destination central office access code at step 110 after the VoIP call setup and then transmits the digits '2, 1, 8, 7, 4, 6 and 8' of the destination telephone number to the PSTN 18 at step 114 after the VoIP speech path establishment in step 112.

In the VoIP call service as described above, the determination of the end of a sequence of digits is accomplished by either the key '#' being submitted by the calling party or the expiry of a predetermined amount of time without key input by the calling party thereby causing a delay in the VoIP call setup process. The reason for the delay in the VoIP call setup is that most subscribers of the user terminals A 10 do not ordinarily press the key '#', and therefore the delay of the three seconds must occur. Accordingly, the subscribers of the user terminals A 10 must undergo inconvenience and delay in the VoIP call setup.

Also, when the subscriber of the user terminal A 10 does not receive a second dial tone from the destination central office after submitting the access code '9', the subscriber of the user terminal A 10 will suffer inconvenience. In more detail, when the subscriber of the user terminal A 10 holds a handset of the user terminal A 10 in his or her hand so as to attempt to dial the destination telephone number "218-7468" of the user terminal B 20, the subscriber of the user terminal A 10 listens for a second dial tone that is to be provided from the local gateway 12.

When the subscriber of the user terminal A 10 can eventually hear the second dial tone (not shown in FIG. 3) provided from a destination central office of the PSTN 18, the caller of the user terminal A 10 is then connected to the called party's user terminal B 20. However, in the setup of FIGS. 1-3, a VoIP speech path is established between remote gateway 16 and user terminal A 10 after the digits for both the central office access code and the destination telephone number are submitted from user terminal A 10. After the speech path is established, the user at terminal A 10 receives a second dial tone indicating that his call is complete.

Figure 4:
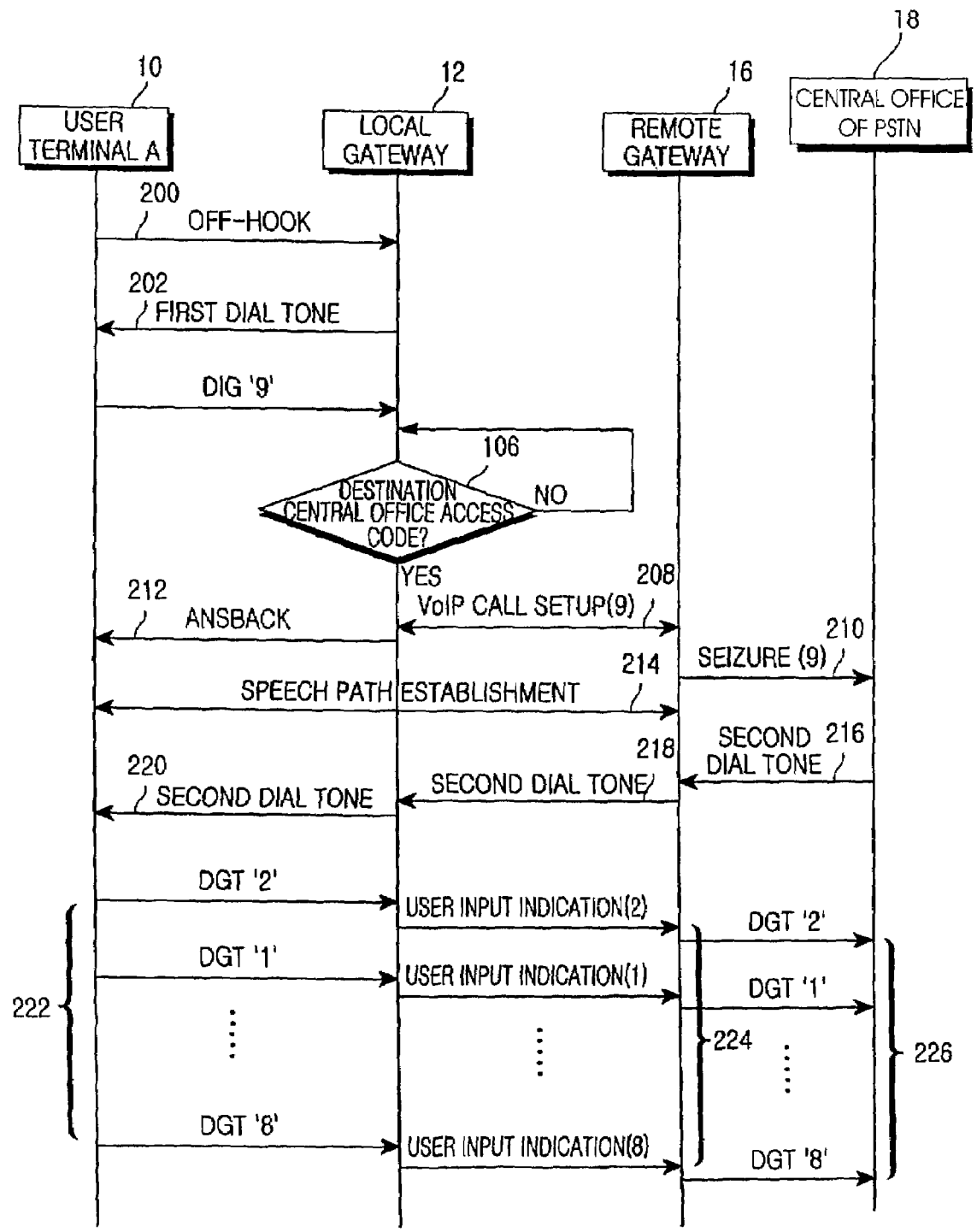
FIG. 4 is a flow chart illustrating a VoIP call service protocol in accordance with the principles of the present invention.
Figure 5:
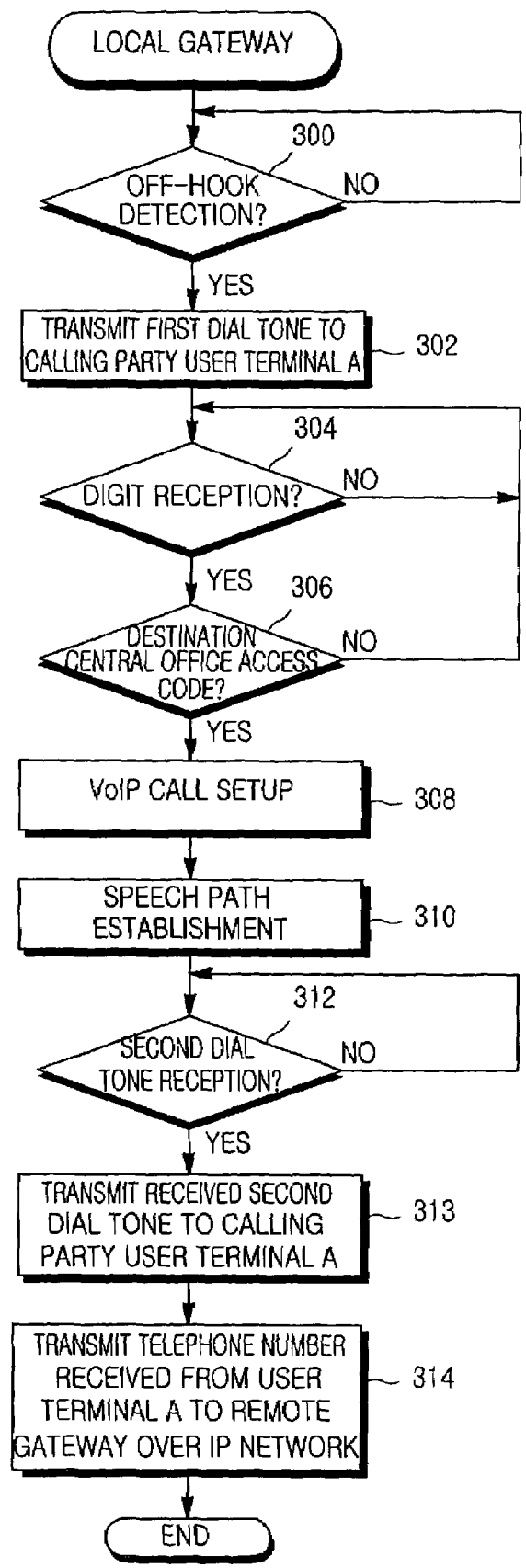
FIG. 5 is a flow chart illustrating a VoIP call process in a local gateway in accordance with the principles of the present invention.

FIG. 4 illustrates a flow chart illustrating a VoIP call service protocol in accordance with the principles of the present invention and FIG. 5 illustrates a flow chart illustrating a VoIP call process in a local gateway in accordance with the principles of the present invention. In the description of FIGS. 4 and 5, like in the description of FIGS. 1-3, it is assumed that the destination central office access code is '9' and a destination telephone number (terminal B) is '218-7468'.

In FIG. 4, a calling party at user terminal A 10 takes a handset off-hook when using a VoIP call service to communicate with a called party at terminal B 20 through VoIP gateways. An off-hook signal is sent from the user terminal A 10 to the local gateway 12 at step 200. It is then determined at step 300 of FIG. 5 whether the off-hook signal is detected by local gateway 12. If the off-hook signal is detected by the local gateway 12, the local gateway 12 provides the calling party 10 with a first dial tone at step 302 of FIG. 5. At step 202 of FIG. 4, the first dial tone is transferred from the local gateway 12 to the calling party user terminal A 10.

When the caller at the user terminal A 10 hears the first dial tone, the caller enters only the key corresponding to the destination central office access code (e.g., digit '9'). The digit (DGT) of the destination central office access code is then transferred from the user terminal A 10 to the local gateway 12 at step 204 of FIG. 4.

It is determined at step 304 of FIG. 5 whether the digit corresponding to the destination central office access code is received by the local gateway 12. If the digit is received by the local gateway 12, it is then determined at step 306 of FIG. 5 (and step 206 of FIG. 4) whether received digit is the destination central office access code (digit '9'). When the received digit is the destination central office access code (digit '9'), the local gateway 12 performs a VoIP call setup with remote gateway 16 using the digit '9' of the destination central office access code at step 308 of FIG. 5 and step 208 of FIG. 4. As described above, the VoIP call setup using the digit '9' of the destination central office access code in accordance with the principles of the present invention has the advantage over the process of FIG. 3 in that the call setup time can be reduced.

When it is determined that the digit received by the local gateway 12 is an access code for the destination central office, local gateway 12 transmits an ANSBACK signal to the user terminal A 10 to inform the user terminal A 10 that a VoIP speech path establishment is possible between the remote gateway 16 and the user terminal A 10 in step 212 of FIG. 4. After transmission of the ANSBACK signal from local gateway 12 to caller 10, a VoIP speech path is setup between the user terminal A 10, the local gateway 12 and the remote gateway 16 as illustrated in step 310 of FIG. 5 and step 214 of FIG. 4.

In addition to the above, remote gateway 16 seizes the PSTN 18 using the digit '9' of the destination central office access code in step 210 of FIG. 4 after the VoIP call setup. If a destination central office (CO) of the PSTN 18 receives the destination central office access code (digit '9'), the destination central office of the PSTN 18 transfers a second dial tone in step 216 to the remote gateway 16 in response to receipt of the destination central office access code (digit '9'). The remote gateway 16 then relays the second dial tone to the local gateway 12 over the IP network 14 in steps 218 and 312. This second dial tone is again relayed to caller 10 in step 313 of FIG. 5 and step 220 of FIG. 4. It is to be appreciated that the sound heard by the calling party who receives the second dial tone is a sound that is distinguishable from the first dial tone. The receipt of the second dial tone at A 10 informs the caller that a connection has been established between the caller and the destination PSTN 18 and prompts the caller to enter the called party's destination telephone number (218-7468).

The destination telephone number can be transmitted using a user input indication message. An outband method of H.245 transmits DTMF signals corresponding to the digit into the signaling channel, differing from an inband method transmitted through the RTP (Realtime Transfer Protocol) channel by compressing the DTMF tone corresponding to the digit such as voice. The user input indication message is a type of message transmitted through the signaling channel.

When the subscriber of the user terminal A 10 presses keys corresponding to the telephone number (218-7468) of the destination user terminal B 20, the digits (DGTs) of the destination telephone number in DTMF are transferred from the user terminal A 10 to the local gateway 12 as illustrated in step 222 of FIG. 4. The local gateway 12 relays the destination telephone number in H.323 to remote gateway 16 over IP network 14 via the VoIP speech path as illustrated in step 224 of FIG. 4 and step 314 of FIG. 5. The DTMF transmission scheme includes an inband scheme (Q.931 scheme) and an outband scheme (H.245 scheme). Accordingly, the remote gateway 16 relays the digits '2, 1, 8, 7, 4, 6 and 8' of the destination telephone number to the destination central office of the PSTN 18 in DTMF format as illustrated in step 226 of FIG. 4.

After the subscriber of the user terminal A 10 dials the telephone number of the called party B 20, the calling party at user terminal A 10 hears a ring back tone or a busy tone according to a state of the called party's terminal B 20. Then, when the called party answers his phone by taking the handset off-hook at B 20, an ANSBACK signal is transferred from the user terminal B 20 to the remote gateway 16. In response to receiving the ANSBACK signal by remote gateway 16, a VoIP TANDEM call path is established between the remote gateway 16 and the called party's terminal B 20 enabling the calling party at terminal A 10 to communicate with the called party at terminal B 20.

As apparent from the above description, the present invention provides a method for providing call service in a VoIP system that can first establish a VoIP speech path upon receipt of a destination central office access code from the caller. After the VoIP call has been set up and the speech path is established, the calling party receives a second dial tone prompting the calling party to enter the destination telephone number in order to form a communication path between the calling party at terminal A 10 and the called party at terminal B 20.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for placing a voice over Internet protocol (VoIP) call via a local gateway disposed between a calling party user terminal and a remote gateway, said method comprising the steps of:
   determining whether the local gateway receives a destination central office access code from the calling party;
   establishing a VoIP speech path between the calling party and a remote gateway when said local gateway receives said destination central office access code from said calling party;
   receiving a destination telephone number from said calling party by said local gateway after establishment of said VoIP speech path; and
   relaying said destination telephone number to said remote gateway.

2. The method of claim 1, further comprising the step of performing VoIP call setup between the local gateway and the remote gateway by the local gateway prior to establishing the VoIP speech path.

3. The method of claim 1, the destination telephone number being transmitted and relayed using a dual tone multifrequency (DTMF) transmission scheme in H.323.

4. The method of claim 3, the destination telephone number being transmitted using a user input indication message based on the DTMF transmission scheme in H.323.

5. A method for placing a voice over Internet protocol (VoIP) telephone call via a local gateway disposed between a remote gateway and a user terminal of a calling party, said method comprising the steps of:
   detecting, by the local gateway, an off hook condition of the user terminal of the calling party;
   providing to the calling party's user terminal a first dial tone from the local
   gateway in response to said detecting of the off hook condition;
   receiving an input digit from the user terminal of the calling party by the local gateway;
   determining whether the input digit received by the local gateway is a destination central office access code;
   performing a VoIP call setup by the local gateway between the local gateway and the remote gateway when the input digit is the destination central office access code;
   establishing a VoIP speech path between the calling party's user terminal and the remote gateway;
   generating a second dial tone by the destination central office and relaying said second dial tone to the calling party's user terminal;
   inputting a called party telephone number by the calling party at the calling party's user terminal in response to receipt of the second dial tone; and relaying said called party telephone number to the destination central office from said user terminal of the calling party.

6. The method of claim 5, the called party's telephone number being dual tone multifrequency (DTMF) transmission scheme in H.323.

7. The method of claim 6, the called party's telephone number being transmitted using a user input indication message based on the DTMF transmission scheme in H.323.

8. The method of claim 6, the relaying step being followed by establishing a speech communication path between a called party's user terminal and the calling party's user terminal.

9. A method for placing a call between a calling party's user terminal and a called party's user terminal using voice over the internet protocol (VoIP), said calling party's user terminal being connected to a local gateway which is connected to a remote gateway that is connected to a public switched telephone network (PSTN) that is connected to the called party's user terminal, said method comprising the steps of:

picking up a receiver of the calling party's user terminal by the calling party;

receiving a first dial tone at said calling party's user terminal from the local gateway;

inputting an access code for the central office of the PSTN connected to the called party's user terminal at the calling party's user terminal;

performing VoIP call setup between the local gateway and the remote gateway upon receipt of the access code by the local gateway;

establishing VoIP speech path between the calling party's user terminal and the remote gateway;

delivering said access code to the PSTN;

generating a second dial tone by the PSTN in response to receiving said access code;

relaying the second dial tone to the user terminal of the calling party;

inputting a destination telephone number by a calling party into a user terminal of the calling party in response to hearing said second dial tone;

relaying said destination telephone number to the central office of the PSTN;

ringing the called party's user terminal; and picking up a receiver at the called party's user terminal and commencing conversation with the calling party.

10. The method of claim 9, said destination telephone number being transmitted and relayed as a series of DTMF signals.

11. The method of claim 10, the destination number being in H.323 transmission scheme.

* * * * *